US012594840B2

(12) United States Patent
Maddi Reddy et al.

(10) Patent No.: US 12,594,840 B2
(45) Date of Patent: Apr. 7, 2026

(54) METHOD AND SYSTEM FOR RECOVERING FROM TORQUE REDUCTION CONTROL

(71) Applicant: Ford Global Technologies, LLC, Dearborn, MI (US)

(72) Inventors: Nithesh Maddi Reddy, Canton, MI (US); Matthew Shelton, Grosse Ile, MI (US); Kyle Culek, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 18/531,522

(22) Filed: Dec. 6, 2023

(65) Prior Publication Data

US 2025/0187450 A1 Jun. 12, 2025

(51) Int. Cl.
*B60L 15/20* (2006.01)
*B60L 3/10* (2006.01)

(52) U.S. Cl.
CPC .............. *B60L 15/20* (2013.01); *B60L 3/106* (2013.01); *B60L 2240/423* (2013.01); *B60L 2240/461* (2013.01); *B60L 2240/463* (2013.01); *B60L 2240/465* (2013.01); *B60L 2260/42* (2013.01)

(58) Field of Classification Search
CPC .... B60L 15/20; B60L 3/106; B60L 2240/423; B60L 2240/461; B60L 2240/463; B60L 2240/465; B60L 2260/42
See application file for complete search history.

(56) References Cited

U.S. PATENT DOCUMENTS

| | | | | |
|---|---|---|---|---|
| 4,966,250 A | * | 10/1990 | Imaseki ............. | B60K 23/0808 475/86 |
| 5,137,105 A | * | 8/1992 | Suzuki .................. | B60K 28/16 180/197 |
| 5,839,084 A | * | 11/1998 | Takasaki ................ | B60K 17/35 701/67 |
| 6,202,020 B1 | | 3/2001 | Kyrtsos | |
| 9,073,566 B2 | | 7/2015 | Takenaka et al. | |
| 9,278,590 B2 | * | 3/2016 | Friel ....................... | B60T 8/172 |
| 9,434,388 B2 | | 9/2016 | Huntzicker et al. | |
| 11,318,947 B2 | | 5/2022 | Hassel et al. | |
| 12,054,045 B1 | * | 8/2024 | Culek ................ | B60K 23/0808 |
| 2003/0151302 A1 | * | 8/2003 | Anwar ................ | B60T 8/17616 303/112 |
| 2021/0046827 A1 | * | 2/2021 | Greenwood ............ | B60L 15/20 |

* cited by examiner

*Primary Examiner* — Gertrude Arthur Jeanglaude
(74) *Attorney, Agent, or Firm* — McCoy Russell LLP

(57) ABSTRACT
Methods and systems for adjusting wheel torque to a driver demand wheel torque after the wheel torque has been reduced below the driver demand wheel torque are described. In one example, a rate at which wheel torque is returned to driver demand wheel torque is based on sign changes for wheel speed.

19 Claims, 5 Drawing Sheets

METHOD AND SYSTEM FOR RECOVERING FROM TORQUE REDUCTION CONTROL

FIELD

The present description relates to methods and a system for controlling wheel torque of a vehicle.

BACKGROUND AND SUMMARY

A vehicle may travel under a variety of different road conditions including, but not limited snow, ice, water, gravel, dry concrete, dry asphalt, etc. Thus, the conditions of a surface of road being travelled may be based on materials used to construct the road as well as environmental conditions. In addition, the surface of the road may change within a short distance such that the road's coefficient of friction changes substantially in a short period of time.

Vehicle stability and traction control systems may modify wheel torque to maintain traction and vehicle stability. For example, if a drive wheel begins to rotate at a speed that is faster than the same wheel would rotate at the vehicle's present longitudinal speed, torque supplied to the drive wheel may be reduced. By reducing the wheel torque, it may be possible to maintain the vehicle's direction of travel and maintain at least some propulsive effort.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 2:
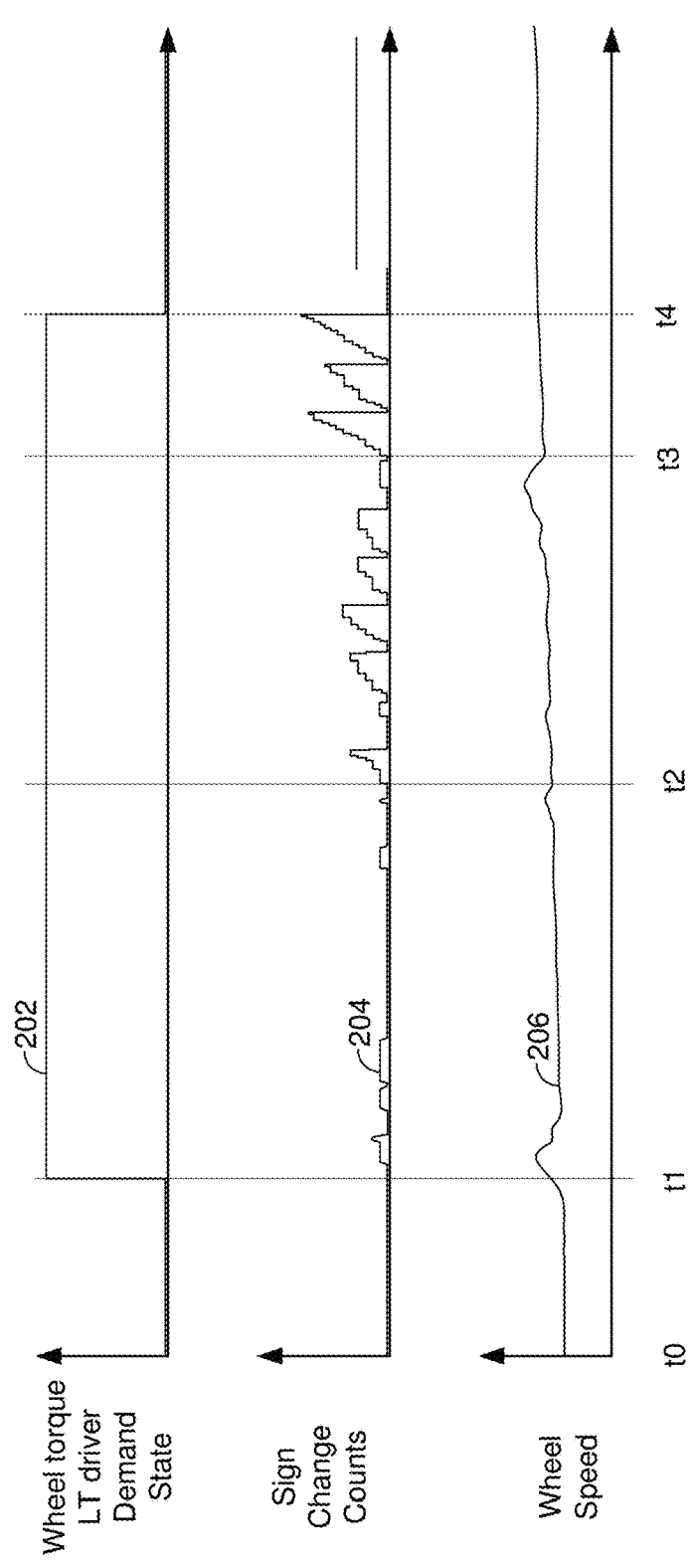
FIG. 2 shows an example vehicle operating sequence according to the methods of FIGS. 3-5.
Figure 3:
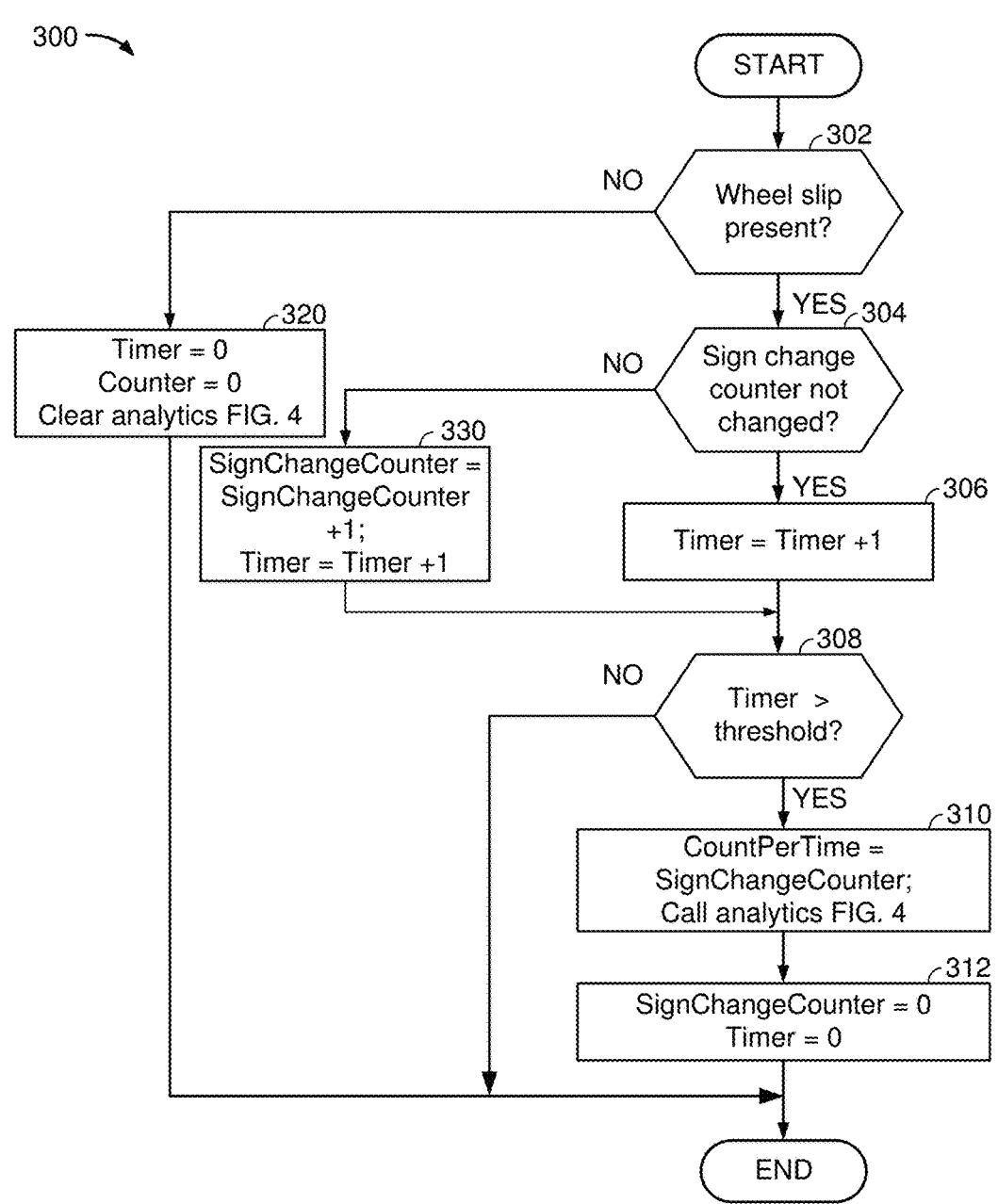
FIG. 3 shows an example method for determining a sign change for a wheel speed rate of change.
Figure 4:
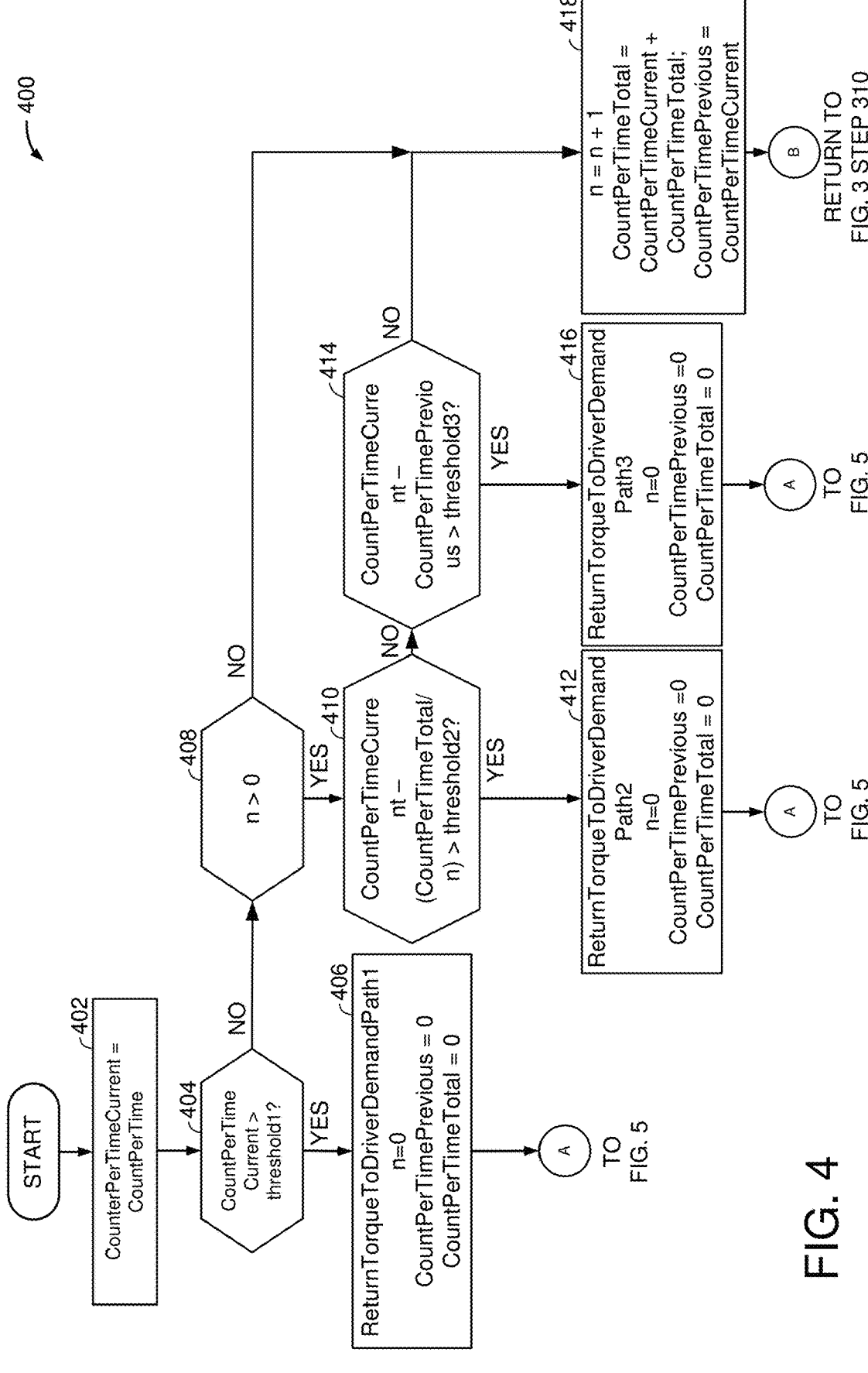
FIG. 4 shows a flowchart of an example method selecting an execution strategy path for recovering from wheel torque reduction control.
Figure 5:
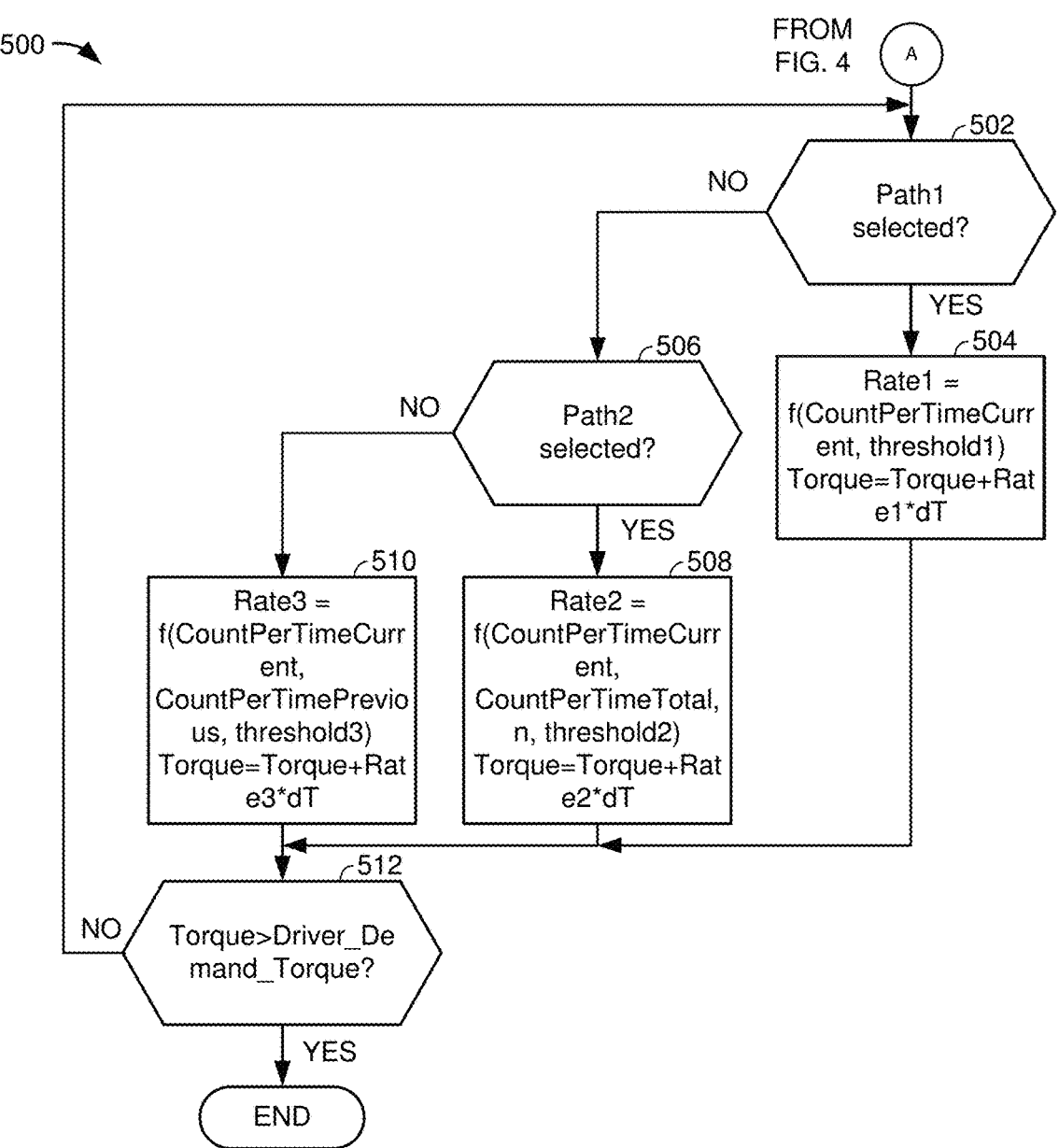
FIG. 5 shows a flowchart for adjusting wheel torque when recovering from wheel torque reduction control.

The present description is related to managing wheel torque of a vehicle. During conditions when wheel slip is detected, wheel torque may be reduced to increase vehicle stability and traction. Once wheel slip is reduced, wheel torque may be adjusted to match a driver demand wheel torque in a way that reduces a possibility of inducing further wheel slip and decreases an amount of time it takes for wheel torque to match driver demand wheel torque. In one non-constraining example, wheel torque may be controlled for an electric vehicle of the type shown in FIG. 1; however, it may be appreciated that the method described herein may be applied to hybrid vehicles and vehicles that are propelled solely via an internal combustion engine. An example vehicle operating sequence according to the methods of FIGS. 3-5 is shown in FIG. 2. FIG. 3 shows an example method for determining a sign change for a wheel speed rate of change. A method for selecting a strategy path and rate that wheel torque is adjusted when recovering from wheel torque reduction based on wheel slip is shown in FIG. 4. Finally, a method for adjusting wheel torque to match driver demand wheel torque is shown in FIG. 5.

A vehicle may include a controller to manage wheel slip (e.g., a relative motion between a tire of a wheel and the surface that the tire is on). The controller may reduce wheel torque when wheel slip is detected so that wheel slip may be reduced. However, returning wheel torque to a driver demand wheel torque after the wheel torque has been reduced to manage wheel slip may lead to drivability issues such as inability to meet driver demand for longer than may be desired or reentering slip conditions. Therefore, it may be desirable to provide a way of returning wheel torque toward a driver demand wheel torque such that wheel torque may approach driver demand wheel torque sooner and so that a possibility of reintroducing wheel slip may be reduced.

The inventors herein have recognized the above-mentioned disadvantage and have developed a method for operating a vehicle, comprising: via a controller, adjusting a rate a wheel torque is increased toward a driver demand wheel torque according to a count of a change in signs between a first change in a wheel speed and a second change in the wheel speed.

By adjusting a rate that wheel torque is increased toward driver demand torque according to a count of a change in signs between a first change in a wheel speed and a second change in the wheel speed, it may be possible to move a wheel torque to a driver demand wheel torque at a faster rate without generating more wheel slip than may be desired. The count of the change in signs between the first change in wheel speed and the second change in the wheel speed may be more sensitive to detect wheel slip, or absence of the same, than other methods that rely on a difference between a reference speed and a present wheel speed. Thus, applying a count of a change in signs of differences in wheel speeds as a basis for increasing wheel torque to a driver demand wheel torque may provide a more desirable torque trajectory from a truncated wheel torque to requested driver demand wheel torque.

The present description may provide several advantages. In particular, the approach may reduce an amount of time it takes to return to a driver demand wheel torque after wheel torque has been reduced to lower wheel slip. Further, the approach may reduce a possibility of reintroducing wheel slip when transitioning from a reduced wheel torque to a requested driver demand wheel torque. Additionally, the approach relies on a particular approach for detecting wheel slip that may have a higher sensitivity level than other methods so that the resulting torque control may exhibit higher fidelity and accuracy.

The above advantages and other advantages, and features of the present description will be readily apparent from the following Detailed Description when taken alone or in connection with the accompanying drawings.

Figure 1:
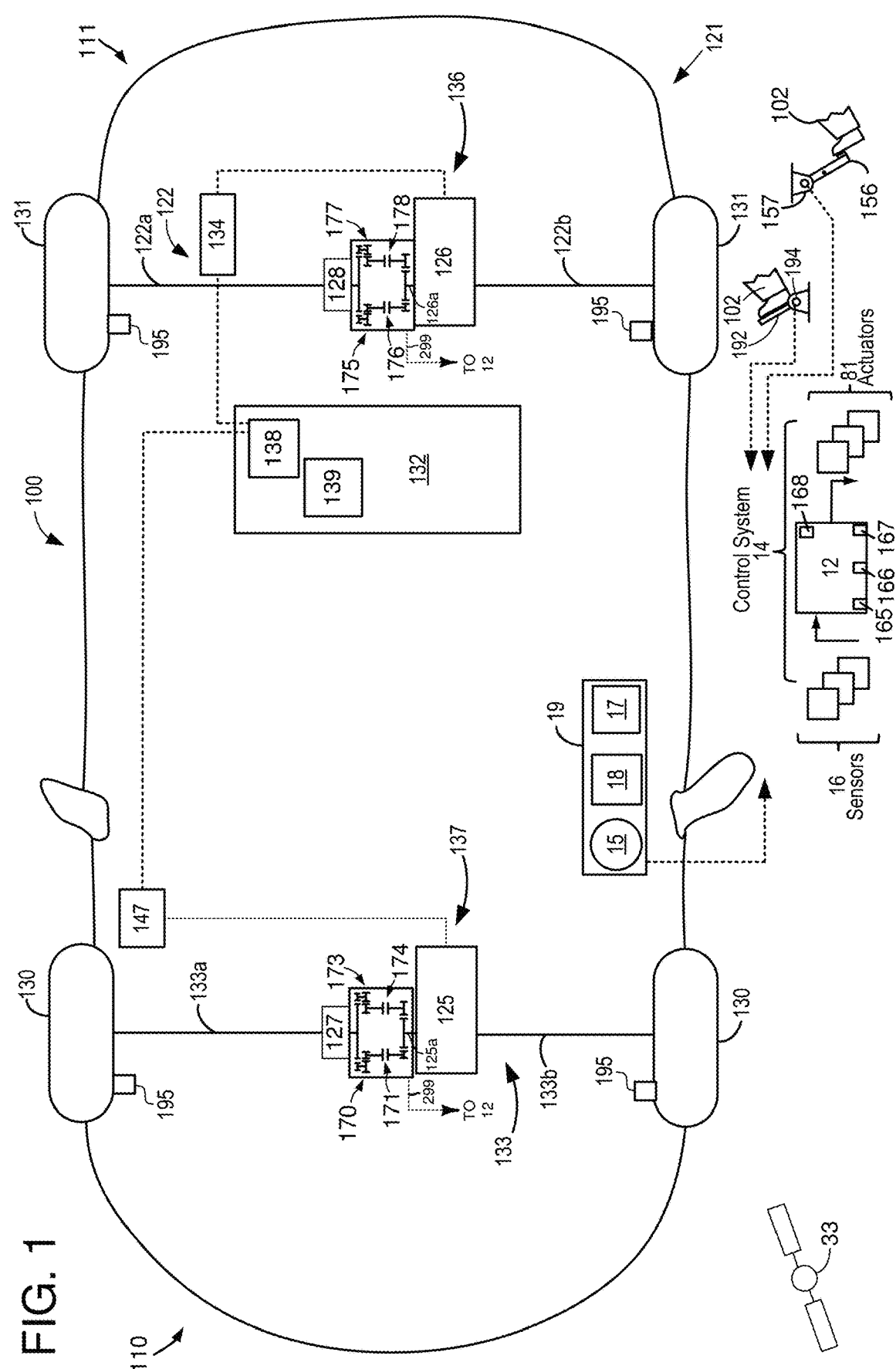
FIG. 1 is a schematic diagram of a non-limiting electric vehicle.

Referring to FIG. 1, a non-limiting example vehicle propulsion system 100 for vehicle 121 is shown. A front portion of vehicle 121 is indicated at 110 and a rear portion of vehicle 121 is indicated at 111. Vehicle propulsion system 100 includes at two propulsion sources including front electric machine 125 and rear electric machine 126. However, in other examples, vehicle 121 may include solely one electric machine, or alternatively, vehicle 121 may include internal combustion engines or a combination of electric machines and internal combustion engines as propulsion sources. Electric machines 125 and 126 may consume or generate electrical power depending on their operating mode. Throughout FIG. 1, mechanical connections between various components are illustrated as solid lines, whereas electrical connections between various components are illustrated as dashed lines.

Vehicle propulsion system 100 includes a front axle 133 and a rear axle 122. In some examples, rear axle may comprise two half shafts, for example first half shaft 122*a*, and second half shaft 122*b*. Likewise, front axle 133 may comprise a first half shaft 133*a* and a second half shaft 133*b*. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126*a* of rear electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over CAN 299. Alternatively, high gear clutch 178 and low gear clutch 176 may be opened and closed via digital outputs or pulse widths provided via control system 14. Rear drive unit 136 may include differential 128 so that torque may be provided to axle 122*a* and to axle 122*b*. In some examples, an electrically controlled differential clutch (not shown) may be included in rear drive unit 136.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125*a* of front electric machine 125. Low gear 170 may be engaged via fully closing low gear clutch 171. High gear 173 may be engaged via fully closing high gear clutch 174. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. Front drive unit 137 may include differential 127 so that torque may be provided to axle 133*a* and to axle 133*b*. In some examples, an electrically controlled differential clutch (not shown) may be included in front drive unit 137.

Electric machines 125 and 126 may receive electrical power from onboard electrical energy storage device 132 (e.g., a traction battery or a battery that provides power for propulsive effort of a vehicle). Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current (AC) generated by rear electric machine 126 to direct current (DC) for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including compartment heating and air conditioning, engine starting, headlights, compartment audio and video systems, etc.

Control system 14 may communicate with one or more of electric machine 125, electric machine 126, energy storage device 132, etc. Control system 14 may receive sensory feedback information from one or more of electric machine 125, electric machine 126, energy storage device 132, etc. Further, control system 14 may send control signals to one or more of electric machine 125, electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a driver demand pedal. Similarly, control system 14 may receive an indication of an operator requested vehicle wheel caliper torque via a human operator 102, or an autonomous controller. For example, control system 14 may receive sensory feedback from pedal position sensor 157 which communicates with wheel caliper demand pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory memory (e.g., read exclusive memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites 33, and from the signal identify the geographical location of the vehicle. In some examples, the geographical location coordinates may be communicated to controller 12. The navigation system may also break a travel route into an actual total number of segments so that vehicle operation in the segments may be predicted. Navigation system 17 may communicate data from the travel route to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator interface 15 may include interfaces that apply a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the controller 12 to start the engine.

The system of FIG. 1 provides for a vehicle system, comprising: a torque source configured to provide a wheel torque; and a controller including executable instructions stored in non-transitory memory that cause the controller to adjust a rate a wheel torque generated via the torque source is increased toward a driver demand wheel torque according to a count of a change in signs between a first change in a wheel speed and a second change in the wheel speed, and where the change in signs is a change from a positive sign to a negative sign or a change from the negative sign to the positive sign. In a first example, the vehicle system further comprises additional executable instructions stored in non-transitory memory that cause the controller to adjust the rate the wheel torque is increased toward the driver demand wheel torque according to one of three different rates. In a second example that may include the first example, the vehicle system includes where the wheel speed is a speed of a driven wheel. In a third example that may include one or both of the first and second examples, the vehicle system further comprises additional executable instructions stored in non-transitory memory that cause the controller to adjust the rate the wheel torque is increased toward the driver demand wheel torque as a function of a count value accumulated within a predetermined amount of time. In a fourth example that may include one or more of the first through third examples, the vehicle system further comprises additional executable instructions stored in non-transitory memory that cause the controller to adjust the rate the wheel torque is increased toward the driver demand wheel torque as a function of a count value accumulated within a predetermined amount of time and an actual total number of times a control routine is executed. In a fifth example that may include one or more of the first through fourth examples, the vehicle system further comprises additional executable instructions stored in non-transitory memory that cause the controller to adjust the rate the wheel torque is increased toward the driver demand wheel torque as a function of a count value accumulated within a predetermined amount of time and a previous value of the count value accumulated within the predetermined amount of time. In a sixth example that may include one or more of the first through fifth examples, the vehicle system includes where the torque source is an electric machine.

Referring to FIG. 2, an example prophetic wheel torque control operating sequence according to the method of FIGS. 3-5 is shown. The plots of FIG. 2 are time aligned. The sequence of FIG. 2 may be generated via the system of FIG. 1 in cooperation with the method of FIGS. 3-5. The vertical lines at times t0-t4 represent times of interest in the plots.

The first plot from the top of FIG. 2 is a plot wheel torque less than (LT) driver demand wheel torque operating state versus time. The vertical axis represents wheel torque less than driver demand wheel torque state and wheel torque is less than driver demand wheel torque when the height of trace 202 is near the vertical axis arrow. The wheel torque is not less than the driver demand wheel torque when trace 202 is near the horizontal axis. The horizontal axis represents time and time increases from the left side of the figure to the right side of the figure. Trace 202 represents the wheel torque less than driver demand wheel torque state.

The second plot from the top of FIG. 2 is a plot of change in sign counts for wheel speed versus time. The vertical axis represents the actual total number of sign change counts for wheel speed within a calibratable amount of time. The counter value is a function of the count time allotted, the surface tire interaction, the physical characteristics of the vehicle, and the attributes of the powertrain wheel slip controller. The horizontal axis represents time and time increases from the left side of the figure to the right side of the figure. Trace 204 represents an actual total number of sign counts for wheel speed at a given time within a calibratable amount of time.

The third plot from the top of FIG. 2 is a plot of a wheel speed versus time. The vertical axis represents wheel speed and wheel speed increases in the direction of the vertical axis arrow. The horizontal axis represents time and time increases from the left side of the figure to the right side of the figure. Trace 206 represents wheel speed.

At time t0, the wheel torque of a driven wheel (e.g., a wheel that is provided torque via a torque source) is not less than driver demand wheel torque for the driven wheel. The change in sign counts for wheel speed is zero and speed of the driven wheel matches the traversing vehicle speed.

At time t1, the wheel torque of a driven wheel drops below driver demand wheel torque for the driven wheel indicating that the wheel torque for the drive wheel is now less than driver demand torque for the driven wheel in response to wheel slip. The change in sign counts for wheel speed increases, but stays at a lower level, primarily not reacting to the initial wheel slip phase as the wheel torque is dropping. The speed of the driven wheel increases as the tire of the wheel encounters a low μ (e.g., coefficient of friction) surface (e.g., snow).

At time t2, the wheel torque of a driven wheel remains less than driver demand wheel torque for the driven wheel, though the wheel slip controller is raising driven wheel torque to driving surface constraints. The change in sign counts for wheel speed begins increasing to middle levels before falling back to zero. This indicates that the wheel may be traveling on a low μ surface (e.g., an icy road). The sign counter value increases to a middle level which is empirically correlated to low μ values for a given low μ controller before falling back to zero to begin a new time interval for counting. The speed of the driven wheel increases slowly as vehicle speed increases, but near time t3 the wheel speed falls as the wheel encounters a higher u surface.

At time t3, the wheel torque of a driven wheel remains less than driver demand wheel torque for the driven wheel. The change in sign counts for wheel speed begin to increase to higher levels compared to low μ surfaces before falling back to a value of zero. This indicates that the wheel may be traveling on a high μ surface. The sign counter value increases to a higher level before falling back to zero when the counter is reset at a beginning of a new time interval for determining a count value. The speed of the driven wheel increases slowly as vehicle speed increases.

At time t4, the wheel torque of a driven wheel is no longer less than driver demand wheel torque for the driven wheel. This causes the change in sign counts for wheel speed to decrease to zero. The speed of the driven wheel increases as vehicle speed increases.

In this way, a change in sign counts for wheel speed may be determined when wheel torque is less than driver demand wheel torque. The change in sign counts may be applied to determine a rate at which the wheel torque is increased toward the driver demand torque. The surface that is being driven upon affects a maximum value that the change in sign counts is expected to achieve in a predetermined amount of time. This understanding may be a basis for a rate that torque of a wheel is increased to meet driver demand wheel torque.

Referring now to FIG. 3, a method for determining a change in sign (e.g., positive or negative sign) counts for wheel speed is shown. The method of FIG. 3 may be included in the system of FIG. 1 as executable instructions stored in non-transitory memory. Further, portions of the method of FIG. 3 may be actions taken in the physical world by a controller.

At 302, method 300 judges whether or not wheel slip control is activated. In one example, method 300 may determine that wheel slip control is activated according to a value of a variable in controller memory. Further, wheel slip control may be activated when there is a slip condition between a tire of a driven wheel and surface that the tire is traveling upon. The slip condition may be based on a difference between a reference vehicle speed and a driven wheel speed. If method 300 judges that wheel slip control is activated, the answer is yes and method 300 proceeds to 304.

Otherwise, the answer is no and method 300 proceeds to 320. If wheel slip control is activated, the wheel slip controller reduces wheel torque to a torque that is less than the driver demand torque for the wheel that is under wheel slip control.

At 320, method 300 sets the variable Timer to a value of zero, the variable Counter to a value of zero, and sets variable in the method of FIG. 4 to zero. Thus, the control variables are reset. Method 300 proceeds to exit.

At 304, method 300 judges if a sign change counter value has not changed. If the sign change counter value has not changed, the answer is yes and method 300 proceeds to 306. Otherwise, if the sign change counter value has changed, the answer is no and method 300 proceeds to 330. In one example, method 300 judges whether or not the value of the sign change counter value has not changed based on the logic:

$$Data1>=0 \text{ AND } Data2>=0$$
$$OR$$
$$Data1<0 \text{ AND } Data2<0$$

where $Data1=WS(t)-WS(t-1)$, $Data2=WS(t-1)-WS(t-2)$, WS is wheel speed of a driven wheel, t is time of a most recent wheel speed data sample, $t-1$ is time of a second most recent wheel speed data sample, and $t-2$ is time of a third most recent wheel speed data sample. Thus, Data1 and Data2 are rates of change in wheel speed.

At 330, method 300 increments the value of the sign change counter variable SignChangeCounter by a value of one (e.g., SignChangeCounter=SignChangeCounter+1). Additionally, method 300 increments the timer variable Timer by a value of one (e.g., Timer=Timer+1). Method 300 proceeds to 308.

At 306, method 300 increments the timer variable Timer by a value of one (e.g., Timer=Timer+1). Method 300 proceeds to 308.

At 308, method 300 judges whether or not the value of the variable Timer is greater than a threshold amount of time. If so, the answer is yes and method 300 proceeds to 310. Otherwise, the answer is no and method 300 proceeds to exit.

At 310, method 300 adjusts the parameter CountPerTime equal to the value of variable SignChangeCounter. The CountPerTime variable represents the total number of times that the sign of wheel speed has changed in a predetermined amount of time (e.g., the threshold time of step 308). Method 300 also performs the method of FIG. 4 at step 310. Method 300 proceeds to 312.

At 312, method 300 sets the value of SignChangeCounter to zero. Additionally, method 300 sets the value of variable timer to zero. Resetting these variables allows a new CountPerTime value to be determined during an upcoming time interval. Method 300 proceeds to exit.

In this way, method 300 determines whether or not a sign of wheel speed rates of change has changed in a predetermined time interval. The actual total number of times that the sign change of wheel speed rate of change changes may be indicative of the u for the surface that is presently being traveled upon by the vehicle. Additionally, the sign change of wheel speed rate of change may be the basis for determining how much torque is added to wheel torque in a particular time duration to adjust wheel torque back to a driver demand wheel torque.

Referring now to FIG. 4, an example data analytics method whereby a rate that driven wheel torque is adjusted to driver demand torque for the driven wheel is selected from a group of rates is shown. The method of FIG. 4 may be included in the system of FIG. 1 as executable instructions stored in non-transitory memory.

At 402, method 400 equates variable CounterPerTime-Current to the value of variable CountPerTime. The value of CountPerTime is determined at step 310 of FIG. 3. Method 400 proceeds to 404.

At 404, method 400 judges if the value of variable CountPerTimeCurrent is greater than a predetermined first threshold. If so, the answer is yes and method 400 proceeds to 406. If not, the answer is no and method 400 proceeds to 408. This decision checks to determine if the driven wheel's tire is on a high μ surface predicted by the sign change counter value are acceptably large.

At 406, method 400 decides to select a first strategy path that determines a first rate that wheel torque is ramped or adjusted up to the driver demand wheel torque from a value that is reduced from the driver demand wheel torque. Additionally, method 400 sets a variable n (e.g., an actual total number of times that method 400 has executed with no action to return the wheel torque to the driver demand wheel torque) to zero. Method 400 also sets values of variables CountPerTimePrevious and CountPerTimeTotal to zero. Method 400 proceeds to the method of FIG. 5.

At 408, method 400 judges whether or not the value of n is greater than zero. If so, the answer is yes and method 400 proceeds to 410. If not, the answer is no and method 400 proceeds to 418.

At 410, method 400 judges whether or not the value of variable CountPerTimeCurrent minus the value of variable CountPerTimeTotal divided by n is greater than a second predetermined threshold. If so, the answer is yes and method 400 proceeds to 412. If not, the answer is no and method 400 proceeds to 414.

At 412, method 400 decides to select a second strategy path that determines a second rate that wheel torque is ramped or adjusted up to the driver demand wheel torque from a value that is reduced from the driver demand wheel torque. Additionally, method 400 sets a variable n to zero. Method 400 also sets values of variables CountPerTimePrevious and CountPerTimeTotal to zero. Method 400 proceeds to the method of FIG. 5.

At 414, method 400 judges whether or not the value of variable CountPerTimeCurrent minus the value of variable CountPerTimePrevious is greater than a third predetermined threshold. If so, the answer is yes and method 400 proceeds to 416. If not, the answer is no and method 400 proceeds to 418.

At 416, method 400 decides to select a third strategy path that determines a third rate that wheel torque is ramped or adjusted up to the driver demand wheel torque from a value that is reduced from the driver demand wheel torque. Additionally, method 400 sets a variable n to zero. Method 400 also sets values of variables CountPerTimePrevious and CountPerTimeTotal to zero. Method 400 proceeds to the method of FIG. 5.

At 418, method 400 increments the value of n by 1 (e.g., n=n+1). Method 400 also sets the value of variable CountPerTimeTotal equal to the value of variable CountPerTime-Current+CounterPerTimeTotal. Method 400 also equates the variable CountPerTimePrevious to the value of CountPer-TimeCurrent. Method 400 proceeds returns to step 310 of FIG. 3.

Thus, method 400 selects which strategy path is followed to return wheel torque back to driver demand wheel torque when wheel torque has been reduced to manage wheel slip.

Method 400 may make the selection based on historical data (e.g., CountPerTimePrevious) and method 400 operates to determine if there is a change in u that the drive wheel is traveling upon.

Turning now to FIG. 5, a method for adjusting wheel torque according to a wheel speed rate of change sign change count value is shown. The method of FIG. 5 may be included in the system of FIG. 1 as executable instructions stored in non-transitory memory.

At 502, method 500 judges whether or not a first strategy path has been selected to adjust driven wheel torque to driver demand wheel torque for the driven wheel. If so, the answer is yes and method 500 proceeds to 504. Otherwise, the answer is no and method 500 proceeds to 506. Selection of the first strategy path may be determined at step 406 of FIG. 4.

At 504, method 500 determines a first rate that driven wheel torque is adjusted to match driver demand wheel torque for the driven wheel. In one example, the first rate that driven wheel torque is adjusted to match driver demand wheel torque for the driven wheel is a function of variable CountPerTimeCurrent and the first predetermined threshold shown in step 404 of FIG. 4. Using the first rate (Rate1) for ramping driven wheel torque to driver demand torque for the driven wheel, a torque source is commanded to increase the present driven wheel torque (Torque) to the driver demand wheel torque. The driven wheel torque is increased according to the following equation: Torque=Torque+Rate1*dT, where Torque is the present driven wheel torque, Rate1 is the rate that driven wheel torque is adjusted and dT is the amount of time between each execution cycle of method 500. Method 500 proceeds to 512.

At 512, method 500 judges whether or not the present driven wheel torque (Torque) is greater than the driver demand wheel torque (Driver_Demand_Torque). If so, the answer is yes and method 500 exits. Otherwise, the answer is no and method 500 returns to 502.

At 506, method 500 judges whether or not a second strategy path has been selected to adjust driven wheel torque to driver demand wheel torque for the driven wheel. If so, the answer is yes and method 500 proceeds to 508. Otherwise, the answer is no and method 500 proceeds to 510. Selection of the second strategy path may be determined at step 412 of FIG. 4.

At 508, method 500 determines a second rate that driven wheel torque is adjusted to match driver demand wheel torque for the driven wheel. In one example, the second rate that driven wheel torque is adjusted to match driver demand wheel torque for the driven wheel is a function of variables CountPerTimeCurrent, CountPerTimeTotal, n, and the second predetermined second threshold shown in step 410 of FIG. 4. Using the second rate (Rate2) for ramping driven wheel torque to driver demand torque for the driven wheel, a torque source is commanded to increase the present driven wheel torque (Torque) to the driver demand wheel torque. The driven wheel torque is increased according to the following equation: Torque=Torque+Rate2*dT, where Torque is the present driven wheel torque, Rates2 is the rate that driven wheel torque is adjusted and dT is the amount of time between each execution cycle of method 500. Method 500 proceeds to 512.

At 510, method 500 determines a third rate that driven wheel torque is adjusted to match driver demand wheel torque for the driven wheel. In one example, the third rate that driven wheel torque is adjusted to match driver demand wheel torque for the driven wheel is a function of variables CountPerTimeCurrent, CountPerTimePrevious, and the predetermined third threshold shown in step 414 of FIG. 4. Using the third rate (Rate3) for ramping driven wheel torque to driver demand torque for the driven wheel, a torque source is commanded to increase the present driven wheel torque (Torque) to the driver demand wheel torque. The driven wheel torque is increased according to the following equation: Torque=Torque+Rate3*dT, where Torque is the present driven wheel torque, Rates3 is the rate that driven wheel torque is adjusted and dT is the amount of time between each execution cycle of method 500. Method 500 proceeds to 512.

In this way, driven wheel torque may be adjusted to meet a driver demand wheel torque for the driven wheel after torque of the driven wheel has been reduced from the driver demand torque in response to wheel slip. Method 500 manages rates that driven wheel torque is ramped back to the driven wheel driver demand wheel torque according to confidence that a high μ road surface transition has occurred. The confidence and the desired rate of return torque may be determined using criteria that initiated the return of driven wheel torque back to drive wheel driver demand wheel torque. The confidence level and strategy may also be modified according to whether or not the criteria were marginally met or resounding met. For example, if one of the thresholds was a value of 10 and the CountPerTime value were 11, the driven wheel torque may be increased at a first rate (e.g., slowly), but if the CountPerTime value were 30, the driven wheel torque may be increased at a second rate (e.g., fast). Ramping adjustments for each of the three strategy paths may be modified in this way.

Thus, the methods of FIGS. 3-5 provide for a method for operating a vehicle, comprising: via a controller, adjusting a rate a wheel torque is increased toward a driver demand wheel torque according to a count of a change in signs between a first change in a wheel speed and a second change in the wheel speed. In a first example, the method includes where the count is accumulated over a predetermined amount of time. In a second example that may include the first example, the method includes where the rate the wheel torque is increased toward the driver demand wheel torque is selected from three different rates. In a third example that may include one or both of the first and second examples, the method includes where selection of a first rate the wheel torque is increased is based on the count being greater than a threshold count. In a fourth example that may include one or more of the first through third examples, the method includes where selection of a second rate the wheel torque is increased is based on a difference between a current count and a historical average count. In a fifth example that may include one or more of the first through fourth examples, the method includes where selection of a third rate the wheel torque is increased is based on a difference between a current count and a previous count. In a sixth example that may include one or more of the first through fifth examples, the method further comprises reducing wheel torque from the driver demand wheel torque prior to adjusting the rate the wheel torque is increased toward the driver demand wheel torque. In a seventh example that may include one or more of the first through sixth examples, the method includes where the reducing wheel torque from driver demand wheel torque is in response to wheel slip.

The methods of FIGS. 3-5 also provide for a method for operating a vehicle, comprising: via a controller, adjusting a rate a wheel torque is increased toward a driver demand wheel torque according to a difference between a threshold value and a count of a change in signs between a first change in a wheel speed and a second change in the wheel speed. In a first example, the method further comprises reducing the wheel torque from the driver demand wheel torque prior to adjusting the rate the wheel torque is increased toward the driver demand wheel torque. In a second example that may include the first example, the method includes where the rate the wheel torque is increased toward the driver demand torque is selected from a group of rates. In a third example that may include one or both of the first and second examples, the method includes where adjusting the rate a wheel torque is increased includes increasing output torque of a torque source. In a fourth example that may include one or more of the first through third examples, the method includes where the torque source is an electric machine.

As will be appreciated by one of ordinary skill in the art, methods described in FIGS. 3-5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not mandatory to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other system hardware.

This concludes the description. The reading of it by those skilled in the art would bring to mind many alterations and modifications without departing from the spirit and the scope of the description. For example, the systems and methods described herein may be applied to full electric vehicles and vehicles that include an engine and an electric motor for propulsion.

The invention claimed is:

1. A method for operating a vehicle, comprising:
via a controller, adjusting a rate a wheel torque is increased toward a driver demand wheel torque according to a count of a change in signs between a first change in a wheel speed and a second change in the wheel speed, where the count is accumulated over a predetermined amount of time.

2. The method of claim 1, where the rate the wheel torque is increased toward the driver demand wheel torque is selected from three different rates.

3. The method of claim 2, where selection of a first rate the wheel torque is increased is based on the count being greater than a threshold count.

4. The method of claim 3, where selection of a second rate the wheel torque is increased is based on a first difference between a current count and a historical average count.

5. The method of claim 4, where selection of a third rate the wheel torque is increased is based on a second difference between the current count and a previous count.

6. The method of claim 1, further comprising reducing wheel torque from the driver demand wheel torque prior to adjusting the rate the wheel torque is increased toward the driver demand wheel torque.

7. The method of claim 6, where the reducing wheel torque from driver demand wheel torque is in response to wheel slip.

8. A vehicle system, comprising:

a torque source configured to provide a wheel torque; and a controller including executable instructions stored in non-transitory memory that cause the controller to adjust a rate the wheel torque generated via the torque source is increased toward a driver demand wheel torque according to a count of a change in signs between a first change in a wheel speed and a second change in the wheel speed, where the change in signs is from a positive sign to a negative sign or from the negative sign to the positive sign, and where the count is accumulated over a predetermined amount of time.

9. The vehicle system of claim 8, further comprising additional executable instructions stored in non-transitory memory that cause the controller to adjust the rate the wheel torque is increased toward the driver demand wheel torque according to one of three different rates.

10. The vehicle system of claim 8, where the wheel speed is a speed of a driven wheel.

11. The vehicle system of claim 8, further comprising additional executable instructions stored in non-transitory memory that cause the controller to adjust the rate the wheel torque is increased toward the driver demand wheel torque as a function of a count value accumulated within the predetermined amount of time.

12. The vehicle system of claim 8, further comprising additional executable instructions stored in non-transitory memory that cause the controller to adjust the rate the wheel torque is increased toward the driver demand wheel torque as a function of a count value accumulated within the predetermined amount of time and an actual total number of times a control routine is executed.

13. The vehicle system of claim 8, further comprising additional executable instructions stored in non-transitory memory that cause the controller to adjust the rate the wheel torque is increased toward the driver demand wheel torque as a function of a count value accumulated within the predetermined amount of time and a previous value of the count value accumulated within the predetermined amount of time.

14. The vehicle system of claim 8, where the torque source is an electric machine.

15. A method for operating a vehicle, comprising:

via a controller, adjusting a rate a wheel torque is increased toward a driver demand wheel torque according to a difference between a threshold value and a count of a change in signs between a first change in a wheel speed and a second change in the wheel speed, where the count is accumulated over a predetermined amount of time.

16. The method of claim 15, further comprising reducing the wheel torque from the driver demand wheel torque prior to adjusting the rate the wheel torque is increased toward the driver demand wheel torque.

17. The method of claim 15, where the rate the wheel torque is increased toward the driver demand wheel torque is selected from a group of rates.

18. The method of claim 15, where adjusting the rate the wheel torque is increased includes increasing output torque of a torque source.

19. The method of claim 18, where the torque source is an electric machine.

* * * * *